(12) United States Patent
Faris

(10) Patent No.: US 6,876,429 B2
(45) Date of Patent: Apr. 5, 2005

(54) FLAT PANEL DISPLAY AND A METHOD OF FABRICATION THEREFOR

(75) Inventor: Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 10/759,386

(22) Filed: Jan. 16, 2004

(65) Prior Publication Data

US 2004/0212775 A1 Oct. 28, 2004

Related U.S. Application Data

(62) Division of application No. 08/784,440, filed on Jan. 16, 1997, now Pat. No. 6,680,758.

(51) Int. Cl.⁷ .................. G02F 1/1347; G02F 1/1335
(52) U.S. Cl. ................ 349/187; 349/73; 349/115; 349/117; 349/119; 349/139; 349/176; 349/197
(58) Field of Search .................... 349/18, 74, 77, 349/98, 115, 117, 119, 138, 139, 176, 187, 193, 194, 196, 197; 359/487, 488, 494, 495, 634, 900

(56) References Cited

U.S. PATENT DOCUMENTS

| | | | | | |
|---|---|---|---|---|---|
| 5,096,520 A | * | 3/1992 | Faris | ............................ | 156/99 |
| 5,221,982 A | * | 6/1993 | Faris | ............................ | 349/115 |
| 5,459,591 A | * | 10/1995 | Faris | ............................ | 349/1 |

\* cited by examiner

*Primary Examiner*—Toan Ton
*Assistant Examiner*—Tai Duong

(57) ABSTRACT

Provided herein is a method for fabricating an array. A plurality of insulating media are formed having a plurality of wavelength and polarizing elements embedded therein at an angle relative to the surfaces of the media, such that the spacing between elements halves for each different medium. A phase shifter arrangement is also formed such that a portion of conductive material is disposed on a surface of the insulating media in registry with every other element in each of the media, and other portion of conductive material disposed on another surface overlapping said elements. A phase shifting material is disposed over at least said every other element. The media are stacked such that the topmost insulating medium has two elements, and each succeeding medium has twice as many elements as a preceding medium.

12 Claims, 8 Drawing Sheets

FLAT PANEL DISPLAY AND A METHOD OF FABRICATION THEREFOR

RELATED APPLICATIONS

This application is a Divisional of U.S. patent application Ser. No. 08/784,440 entitled Flat Panel Display and Method of Manufacture filed Jan. 16, 1997, now issued U.S. Pat. No. 6,680,758.

BACKGROUND OF THE INVENTION

1. Field of the Invention

The present invention relates generally to display devices for beam steering and scanning and, more particularly, to flat panel display devices for beam steering and scanning which are electronic in character and which further incorporate logic trees which are designed to steer electromagnetic energy so that both transmission losses and the number of energizing sources of an imaging array are minimized. The devices include a multi-stage imaging array made up of a plurality of stacked logic trees so arranged that each stage of each logic tree includes active steering elements which access twice as many like steering elements and associated passive steering elements in each succeeding stage. The active and passive elements incorporate cholesteric liquid crystal (CLC) elements which are polarization sensitive disposed within them at an angle of 45°. The active elements include variable half-wave retarders which, under control of a programmable pulsed source change the polarization of incident energy on CLC elements and provide a scanned line of electromagnetic energy to the imaging cells disposed at the output of each logic tree. In such an arrangement, array transmission losses are minimized and one source of electromagnetic energy per logic tree is required.

In another arrangement using a similar imaging array, transmission losses are reduced over prior art input arrangements and the number of sources of electromagnetic energy is reduced to one. Using an input logic tree, fed from a single laser and arranged perpendicularly to the array logic trees, the imaging cells of the input logic tree act as inputs to the stacked logic trees of the imaging array. In this way, a scanned line is delivered from each imaging cell of the input logic tree to the first active element of an associated array logic tree. From there, under control of a programmable pulsed generator, portions of the scanned line are directed to the output imaging cells of each of the array logic trees. Two-dimensional images are built up in this way by activating the imaging cells of each array logic tree in succession. Three dimensional images may be obtained using an approach similar to that just described by interleaving stereo displaced images from a 3-D camera at the output imaging cells of an imaging array by activating the first and every other logic tree of an array with one image and the second and every other logic tree with a stereo displaced image. Glasses which respond to a different polarization for each eye are required to produce the 3-D effect.

The present invention also relates to a method of fabricating the above described imaging arrays by slicing stacked alternating layers of insulating material and CLC material. To the extent that a final imaging array requires that each logic tree have twice as many CLC elements per stage as a preceding stage after the first stage, the number of CLC element per stage may doubled by halving the spacing between CLC elements during fabrication. This is accomplished by halving the thickness of the insulation disposed between layers of CLC material after setting the initial spacing between CLC layers which are to be used as the first stage of a logic tree. After producing layers of a given thickness by slicing at a 45° angle, transparent metallic ground planes are formed. Then, using photolithographic and etching techniques, electrodes are formed over every other CLC element. A spacer element is then fixed to the periphery of each layer and the resulting volume is filled with a phase shifter material. The resulting stages are then stacked using as many as required to form an imaging array with a desired number of imaging cells. Stacking the stages, which are slices containing differently spaced CLC elements automatically provides the logic trees which deliver scanned line to the output imaging cells. The method uses mass-production techniques and results in an inexpensive, flat-panel display.

2. Description of the Prior Art

Generally, there are two well-known techniques for the steering and scanning of light beams. One is electromechanical and the other is acousto-optical. Both techniques have severe limitations. One such limitation is that arrangements incorporating these techniques require a large volume due to the small angel through which the light beam can be deflected. Thus, if it is desired to scan a length B, the deflection arrangement has to be positioned a distance, A, providing an A/B ration larger than 1.

All known systems require an A/B ratio larger than 1 and to the extent that the arrangement of the present application can provide A/B ratios which are very much less than 1, the resulting structure may also be characterized as a flat-panel display. In the known scanning approaches, scanning speed is relatively sluggish due to the use of electromechanical or electro-acoustic elements. Because such devices are eliminated in the scanning arrangement of the present application, scanning speeds in the microsecond range are achievable.

U.S. Pat. No. 4,670,744 filed Mar. 14, 1985 and issued Jun. 2, 1987 in the name of T. Buzak incorporates variable optical retarders and liquid crystal chiral cells. This reference takes advantage of the reflective and transmissive characteristics of chiral cells as well as the ability of variable optical retarders to convert one circular polarization to the other circular polarization. However, when a beam containing image information is projected along a given path in which the chiral cells and retarders are disposed, the beam remains in that given path or is retroreflected along the same path. Opposed to this, the arrangements of the present application while they all incorporate the reflection-transmission characteristics of chiral cells, they all incorporate an ability to divert the reflected beams into other paths. To the extent that the Buzak reference seek to provide a three-dimensional display, all the images reflected must lie in a plane parallel to the planes of the chiral cells. Otherwise distortion and degradation of the reflected images would occur due to the required lateral displacement of the chiral cells. In other words, to provide the desired result, no diversion of the beam in the Buzak reference can be tolerated.

U.S. Pat. No. 5,221,982, filed Jul. 5, 1991 and issued on Jun. 22, 1993 to S. M. Faris is entitled Polarizing Wavelength Separator. The patent relates to a polarizing wavelength separating optical element in the form of a flat panel which causes each of a plurality of polychromatic optical beams from a source, entering at one surface and transmitted to another surface, to be converted, with high conversion efficiency, into circularly polarized, spectrally and spatially separated beams. The element is made of a periodic array of cells; each of the latter incorporating a plurality of subcells. One subcell functions as a broadband reflector, while each of the remaining subcells acts as a polarizing, wavelength selective reflector. Each subcell comprises a plurality of layers which are bonded together at their surfaces and are oriented at a 45° angle relative to the horizontal surfaces of the panel. In each subcell, the plurality of layers comprise two cholesteric liquid crystal, CLC films, which reflect at a selected wavelength, at least one optical retarder and clear substrates which provide mechanical support. The thicknesses of the supporting substrates are designed to cause the beams transmitted through the element to be spatially separated by appropriate distances.

In the reference, all the elements utilized in the panel are passive in character which constrain beams of electromagnetic energy into paths which are fixed for all time. In contradistinction to this, the present application, with it electronically controllable retarders, provides paths for electromagnetic energy which can be changed from instant-to-instant taking advantage of both the transmissive and reflective capabilities of CLC elements. The combination of a circularly polarized input with controllable retarders and associated CLC elements in the present invention provides the ability to scan a beam from point to point in a panel-like display or to steer a beam it can emanate from any location on an array of imaging cells. Strictly passive arrays with their fixed paths cannot achieve these results.

U.S. Pat. No. 5,459,591, filed Mar. 9, 1994 and issued Oct. 17, 1995 to S. M. Faris relates to beam steering and scanning devices which utilize an imaging cell which incorporates a solid-state cholesteric liquid crystal (CLC) element, an electronically controlled, variable half-wave retarder and a source of circularly polarized light. The CLC element is disposed to an angle (45°) relative to the path along which light from the source is projected and is designed to reflect, at a given wavelength, one circular polarization of light and transmit the other. Using this characteristic, light of one polarization or the other is presented to the variable retarder and depending on whether or not it is actuated, light is either diverted into another orthogonal path or remains in the original path. If another similar imaging cell is disposed in the orthogonal path, light incident on that cell can also be diverted into yet another path or transmitted along the orthogonal path under control of a half-wave retarders associated with said another imaging cells. By arranging a plurality of imaging cells in the form of an array and accessing each row of the cells of the array with a column of similar imaging cells and by selectively activating half-wave retarders associated with each of the cells, monochromatic or polychromatic light from a single source or multiple sources may be steered to a selected cell and reflected from its associated CLC element or elements. Utilizing successive cells in the array and causing reflection of a modulated beam or beams provides a frame in the manner of the usual TV set which is viewed by the eyes as an integrated picture. Successive frames, of course, provide the usual moving images.

SUMMARY OF THE INVENTION

The present invention relates to beam steering and scanning devices which utilize cholesteric liquid crystal (CLC) elements arranged in branches to form a logic tree. Each branch comprises an active and passive CLC element; the former further comprising a half-wave retarder and an electrode and the latter only the CLC element. Each succeeding branch contains twice as many branches as a preceding branch and, by activating active CLC element electrodes under control of a programmable pulsed source, inputs applied to the first stage of a logic tree are delivered as a scanned line of electromagnetic energy or light to the imaging cells of the last stage of the logic tree. By stacking identical logic trees with a laser source for each tree, a flat panel imaging array or display device is formed in which the transmission losses are minimized.

Using a similar imaging array, transmission losses may be further reduced by using a logic tree the outputs of which act as inputs to the imaging array where formerly a plurality of lasers were required. By positioning an input logic tree perpendicularly to the similar logic trees of the imaging array, a single source of energy provides an output at each of its imaging cells which acts as an input to an associated logic tree of the imaging array. 2-D and 3-D images are provided by applying modulation to lasers from standard T.V. cameras and cameras designed to provide stereo displaced images respectively. In the array which provides 3-D images, an image and a stereo displaced image are interleaved to provide the desired images each of which has a different circular polarization.

The present invention also relates to a method of fabricating structures which provide the above described features. Since all the stages of a logic tree differ only in the number of branches they contain, it was recognized that light beams, for example, applied from a laser beam could pass through a number of stages with minimum dispersion and maintain its original position even though relatively large structures are used to control its position. This recognition permitted the use of CLC elements, electrodes and half-wave retarder material which need not be divided into discrete elements in each logic tree. Thus, each CLC element, each electrode and each retarder material may extend from top-to-bottom or from side-to-side in each stage of an imaging array.

Stages are fabricated by slicing layers of insulating material and CLC material at an angle of 45°. The thickness of the insulating material controls the spacing between the resulting CLC elements. Transparent layers, such as indium tin oxide are formed on both sides of the layer or layers containing spaced CLC elements. Using photolithographic techniques, one side is masked and etched to form an electrode over every other CLC element. A spacer element fixed to the periphery of each layer where the electrodes have been etched forms a volume into which half-wave retarder material is introduced in liquid form. In this way, stages containing two, four, eight, sixteen, CLC elements and so on have been massed produced. The stages are then stacked so that each stage contains twice as many CLC elements as a preceding stage forming logic trees the imaging cells of which form an array.

The above described arrangements and their fabrication technique provide flat panel displays which substantially reduce transmission losses and the number of energizing sources. These features combined with a novel and inexpensive manufacturing technique are able to deliver a flat panel display which requires neither a vacuum envelope nor unacceptable high voltages.

It is, therefore, an object of the present invention to provide an imaging array which has reduced transmission losses compared to prior art arrays.

Another object is to provide an imaging array which reduces transmission losses while simultaneously reducing the electromagnetic source requirement to one source.

Still another object is to provide an improved flat panel display which is capable of providing both 2-D and 3-D images.

Still another object is to provide a method of fabricating flat panel display which is inexpensive and conducive to mass-production techniques.

The foregoing objects and features of the present invention will become apparent from the following more detailed description of preferred embodiments taken in conjunction with the accompanying drawings.

DETAILED DESCRIPTION OF PREFERRED EMBODIMENTS

Figure 1:
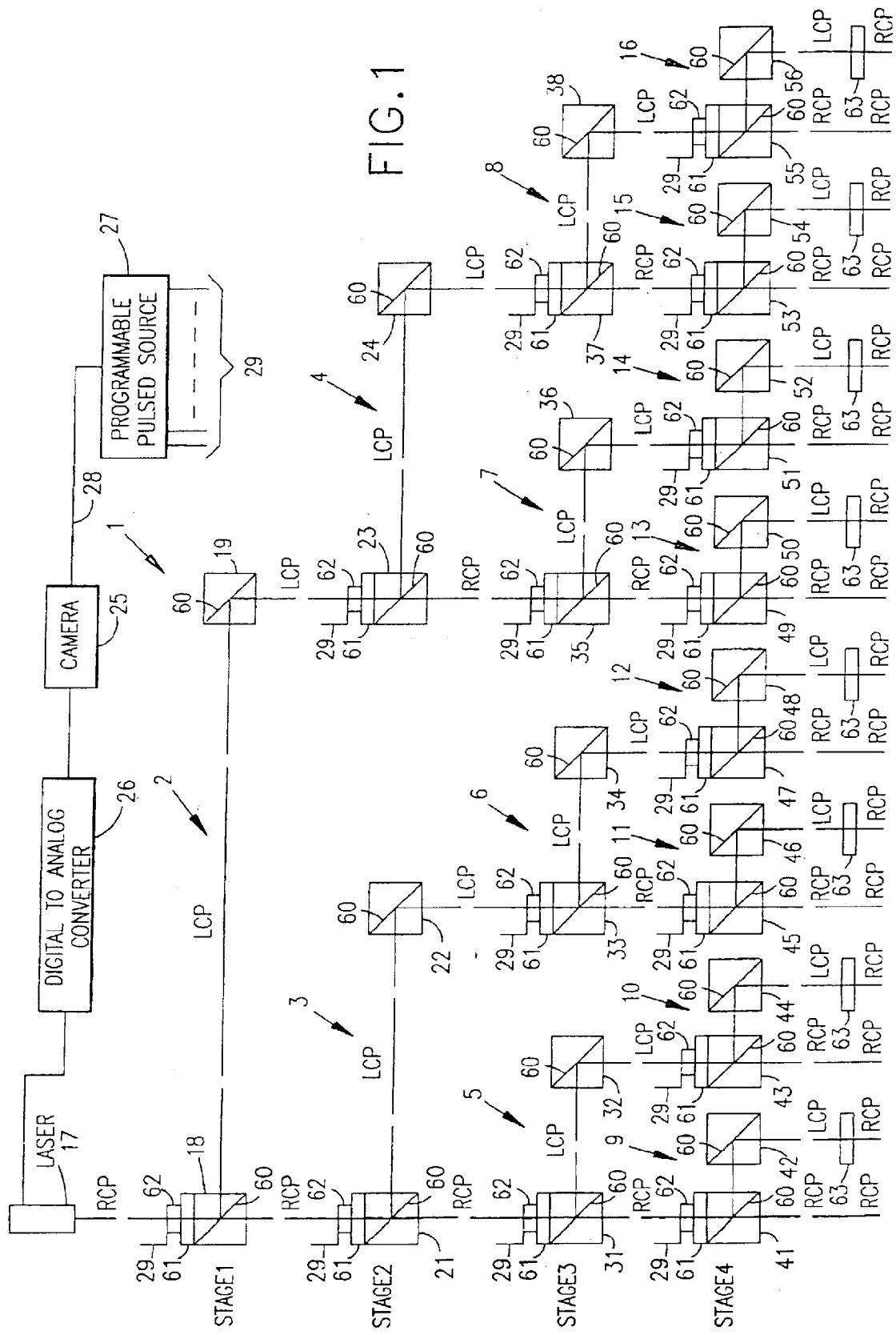
FIG. 1 is a schematic drawing of a logic tree of active and passive Cholesteric Liquid Crystal (CLC) elements so arranged that a single input to a first stage of the logic tree may be delivered to any one of the outputs of the last stage of the logic tree.

Referring now to FIG. 1, there is shown a schematic drawing of a logic tree of active and passive Cholesteric Liquid Crystal (CLC) elements which are so arranged and controlled that a single input to a first stage of the logic tree may be delivered to any one of the outputs of the last stage of the logic tree by appropriately switching electronically controlled half-wave retarders associated with the active CLC elements of the logic tree. By programming the switching of the half-wave retarders of each stage of the logic tree, a laser input to the first stage of the logic tree may, for example, provide a scanned version of the input at the outputs of the last stage of the logic tree. The application of the logic tree as a scanner will be described in detail in what follows. It will also become clear that the same embodiment has other applications.

Considering FIG. 1 in more detail, logic tree 1 is shown consisting of a plurality of stages labeled STAGE 1-STAGE 4 wherein each stage includes one or more branches each of which consists of an active and passive CLC element. Thus, STAGE 1 consists of a branch 2 which, in turn, includes active CLC element 18 and passive CLC element 19. STAGE 2 consists of branches 3, 4; the former including active CLC element 21 and passive CLC element 22 while the latter includes active CLC element 23 and passive CLC element 24. STAGE 3 consists of four branches 5–8 each of the branches consisting of active and passive CLC elements 31, 33, 35, 37 and 32, 34, 36, 38, respectively. Similarly, STAGE 4 consists of eight branches 9–16 each of these branches including active and passive CLC elements 41, 43, 45, 47, 49, 51, 53, 55 and 42, 44, 46, 48, 50, 52, 54, and 56, respectively, just like the previously mentioned branches. At this point, it should be appreciated that many more stages may be added to tree 1 with each succeeding stages having twice as many branches as the preceding stage. Using this approach, STAGE 4 in FIG. 1 has $2^{n-1}$ branches wherein n is the stage number. Thus, STAGE 4 has $2^{4-1}$ or eight branches. Since each branch has two CLC elements, each stage has $2^n$ elements and, for STAGE 4, sixteen elements. Thus, STAGE 10, for example, would have $2^{10}$ or 1024 CLC elements providing one light output per element or 1024 outputs.

Since FIG. 1 is representative of the way logic tree 1 operates regardless of the number of stages, only four stages have been incorporated to clearly demonstrate how such a logic tree may be used to provide a scanned light output from a plurality of elements which are activated by an input from a single source of electromagnetic energy.

Before describing the operation of FIG. 1, it should be understood that the active CLC elements of each branch in FIG. 1 do not depart from similar active elements shown in FIG. 1 of U.S. Pat. No. 5,459,591 entitled "Electromagnetic Energy Beam Steering Devices" in the name of S. M. Faris, which is hereby incorporated by reference. The passive CLC elements of the present invention differ from the active CLC elements in that the passive CLC elements do not incorporate an electronically controlled, variable half-wave retarder or π-cell. Thus, each branch of logic tree 1 as represented by branch 2 of FIG. 1 includes an active CLC element 18 and a passive CLC element 19. The former includes a cholesteric liquid crystal member 60, a transparent electrode 62, a ground plane (not shown), and a controllable half-wave retarder 61 while the latter includes a cholesteric liquid crystal member which is identical to member 60. Since each of the branches 3, 4, 5–8 and 9–16 is identical with branch 2 of FIG. 1, each cholesteric liquid crystal element and each half-wave retarder of each branch is identified with the same reference numbers 60, 61 respectively.

In FIG. 1, active CLC element 18 and passive CLC element 19 of branch 2 both include cholesteric liquid crystal members 60 which are disposed at an angle, preferably 45°, within each of the elements 18, 19. Members 60 are made from a nematic liquid crystal material with chiral additives or polysiloxane side-chain polymers which cause the cigar-shaped molecules to be spontaneously aligned in an optically active structure of either a left-handed or right-handed helix with a helical pitch, P. The twisting direction and the pitch, P, of the helices are determined by the nature and concentration of the additives. A CLC member, like member 60, has all its helices aligned in one direction and is capable of reflecting light, for example, having one circular polarization having a characteristic wavelength or band of wavelengths. Cholesteric Liquid Crystal (CLC) members 60 which are used in the practice of the present invention and their method of fabrication are shown in U.S. Pat. No. 5,221,982, filed Jul. 5, 1991 and issued on Jun. 22, 1993 in the name of S. M. Faris. This patent is herewith incorporated by reference. While CLC members 60 are shown in FIG. 1 as being single elements, it should be understood that a plurality of CLC members 60 may be substituted for each of the members 60 to provide for the reflection and transmission of circularly polarized radiation having a plurality of wavelengths or band of wavelengths which are provided by a plurality of sources of electromagnetic radiation. It should be appreciated that, in the practice of the present invention, members 60 may be made of any material which can be switched to reflect and/or transmit electromagnetic energy by the application of electric or magnetic fields to that material.

Half-wave retarders or π-cells 61 shown schematically in FIG. 1 are of the type shown and described in U.S. Pat. No. 4,670,744, filed Mar. 14, 1985 and issued on Jun. 2, 1987 in the name of T. S. Buzak and may be utilized in the practice of the present invention. The Buzak patent is herewith incorporated by reference. Alternatively, instead of CLC films, polarizing reflectors, polarizing prisms or McNeill prisms may be utilized in the practice of the present invention and are commercially available. When more than a single wavelength of electromagnetic radiation is used in the arrangement of FIG. 1, a broad band π-cell may be utilized to provide half-wave retardation of each wavelength to maintain the same intensity level for each wavelength.

Logic tree 1 of FIG. 1 is activated from a source 17 of electromagnetic radiation which may be a laser or any other source of radiation the output of which may be converted from a linearly polarized orientation to a circularly polarized orientation by means of a quarter-wave plate (not shown) in a manner well known to those skilled in the optical arts. If the resulting output is not appropriately polarized, a half-wave retarder may be utilized to provide the conversion from one circular polarization to the other polarization.

For purposes of the present application, radiation emanating from source 17 is circularly polarized in either a clockwise or counter-clockwise direction. Lasers which are commercially available may be utilized to provide outputs which fall within the visible, infrared or ultraviolet spectra. While source 17 is shown as a single source in FIG. 1, it should be appreciated that it also represents a plurality of sources each having a different wavelength. Thus, source 17 may include lasers which emit at the red, green and blue wavelengths of the visible spectrum so that the projected beam of radiation is a beam of light having a single color or combinations of these wavelengths.

It should also be appreciated that source 17 may comprise lasers or other sources of electromagnetic radiation which are capable of being intensity modulated. In this way, the source output may be varied in intensity from zero to a maximum intensity including all gradations in between.

In FIG. 1, source of electromagnetic radiation 17 is shown directly irradiating a member 60 of active element 18 of branch 2 from which it is either transmitted or reflected depending on the polarization of the emitted radiation. The emitted radiation from source 17 may have a single intensity or it may be an intensity modulated signal provided by a television camera 25 or the like. By appropriately programming π-cells or half-wave retarders 61, an unmodulated or intensity modulated signal is delivered in a scanned manner to the active and passive CLC elements 41–56 of branches 9–16 of STAGE 4. In this way, an unmodulated or intensity modulated beam of radiation is scanned across elements 41–56 providing an output which is similar in every way to a single scan line of a conventional television set.

If an input is provided in digital form, a digital-to-analog converter 26 may be interposed between camera 25 and source 17 in a well-known manner.

In FIG. 1, variable half-wave retarders 61 are activated by a programmable pulsed source 27 which gets timing information from camera 25 via interconnection 28. A plurality of driver interconnections 29 extend from pulsed source 27 and each interconnection 29 is connected to a separate electrode 62 which applies an electric field to an associated half-wave retarder 61 when activated by pulsed source 27. In FIG. 1, fifteen driver interconnections 29 would be utilized each one of which, when pulsed, activates a separate variable half-wave retarder 61.

In operation, logic tree 1 is activated when source 17 is activated. The object is to provide a scanned output from a single input to a plurality of outputs in STAGE 4 of logic tree 1. It is, therefore, required that the outputs of active and passive elements 41, 43, 45, 47, 49, 51, 53, 55 and 42, 44, 46, 48, 50, 52, 54 and 56, respectively, be activated so that outputs are obtained from these elements in the order shown in FIG. 1. Since element 41 is to provide the first output, if the input signal is right-hand circularly polarized (RCP) radiation and all members 60 are designed to be reflective of left-hand circularly polarized (LCP) radiation, the RCP light passes through active elements 18, 21, 31 and 41 unhindered since these elements reflect LCP radiation and transmit RCP radiation. An RCP radiation output, therefore, appears at the output port of element 41.

In the next time period, half-wave retarder 61 of element 41 is activated by a pulse from pulsed source 27 via an interconnection 29 to electrode 62 causing retarder 61 to introduce a half-wave delay into the input RCP radiation which has passed through active elements 18, 21 and 31 causing the RCP radiation to be converted to LCP radiation. The LCP radiation then reflects from member 60 of element 41 which is reflective of LCP radiation toward member 60 of element 42 which is also reflective of LCP radiation. The impinging LCP radiation is then reflected to the output port of element 42.

In the next time period, an output is desired from the output port of active element 43. To accomplish this, retarders 61 at the inputs of active elements 31 of STAGE 3 and active elements 43 of STAGE 4 are activated by applying pulses to their associated transparent electrodes 62.

Once this is done, the RCP radiation at the input of active element 31 is converted to LCP radiation and reflects from LCP reflective member 60 over to LCP reflective member 60 of passive element 32 where it is reflected toward active element 43. The LCP input at active element 43 encounters a half-wave retarder 61 and is converted to RCP radiation. The latter then passes unaffected to the output port of active element 43 because its CLC member 60 reflects only LCP radiation.

In the next interval, pulsed source 27 deactivates half-wave retarder 61 associated with active element 43 and continues activation of the half-wave retarder 61 associated with active element 31. In this way, the LCP radiation impinging on element 43 encounters no delay and remains as LCP radiation which is then reflected from LCP reflective member 60 of element 43 toward passive element 44. The thus reflected LCP radiation is reflected from LCP reflective member 60 of element 44 to its output port.

Rather than tediously describing every passage through every element, the order of the activation of half-wave retarders 61 will be described since every path from input to output port can be gleaned from the previous description and drawing shown in FIG. 1. To obtain an output at active element 45, only the variable half-wave retarders 61 associated with active elements 21 and 33 must be activated. To obtain an output at active element 46, variable half-wave retarders 61 associated with active elements 21, 33 and 45 must be activated. To obtain an output at active element 47, the variable half-wave retarders associated with active elements 21 and 47 must be activated. To obtain an output at passive element 48, only the variable half-wave retarder associated with active element 21 need be activated. An output at active element 49 may be obtained by activating the half-wave retarders associated with active elements 18 and 23. An output at passive element 50 may be obtained by activating the half-wave retarders associated with active elements 18, 23 and 49. To obtain an output at active element 51, the half-wave retarders associated with active elements 18, 35 and 51 must be activated. An output may be obtained from passive element 52 by activating half-wave retarders 61 associated with active elements 18, 23 and 35. To obtain an output at active element 53, half-wave retarders 61 associated with active elements 18 and 37 must be activated. An output at passive element 54 may be obtained by activating half-wave retarders 61 associated with active elements 18, 37 and 53. To obtain an output at active element 55, half-wave retarders 61 associated with active elements 18 and 55 are activated. Finally, active element 56 is activated by activating half-wave retarder 61 associated with active element 18.

Once half-wave retarders 61 are activated by applying pulses to transparent electrodes 62 from programmable pulsed source 27 as described hereinabove, a scanned output varying in intensity at each of the active and passive elements 41 through 56 is obtained. The outputs do not all have the same polarization and, for the embodiment of FIG. 1, have a polarization pattern of alternating RCP and LCP as the elements are scanned from left to right. Recognizing that such variation is present is important where outputs having the same circular polarization are desired or required so that fixed half-wave retarders may be placed to convert all the polarization's to the same polarization. Thus, in FIG. 1, for example, fixed half-wave retarders 63 may be placed at the outputs of active elements 41, 43, 45, 47, 49, 51, 53 and 55 to convert their RCP outputs to LCP. The ability to do this conversion is particularly important in arrangements which provide a 3-D output because the perception of 3-D is based on having two spatially displaced images each of which has a different polarization.

If the input to active CLC element 18 in FIG. 1 is changed to LCP and all the CLC members 60 in logic tree 1 are changed to be reflective of RCP, the outputs obtained are exactly the same as those shown in FIG. 1.

An identical output pattern to that shown in FIG. 1 is obtainable where the input is LCP and all the members 60 are reflective of LCP.

A pattern opposite to that shown in FIG. 1 is obtainable where the input is RCP and all the members 60 are reflective of RCP.

Figure 2:
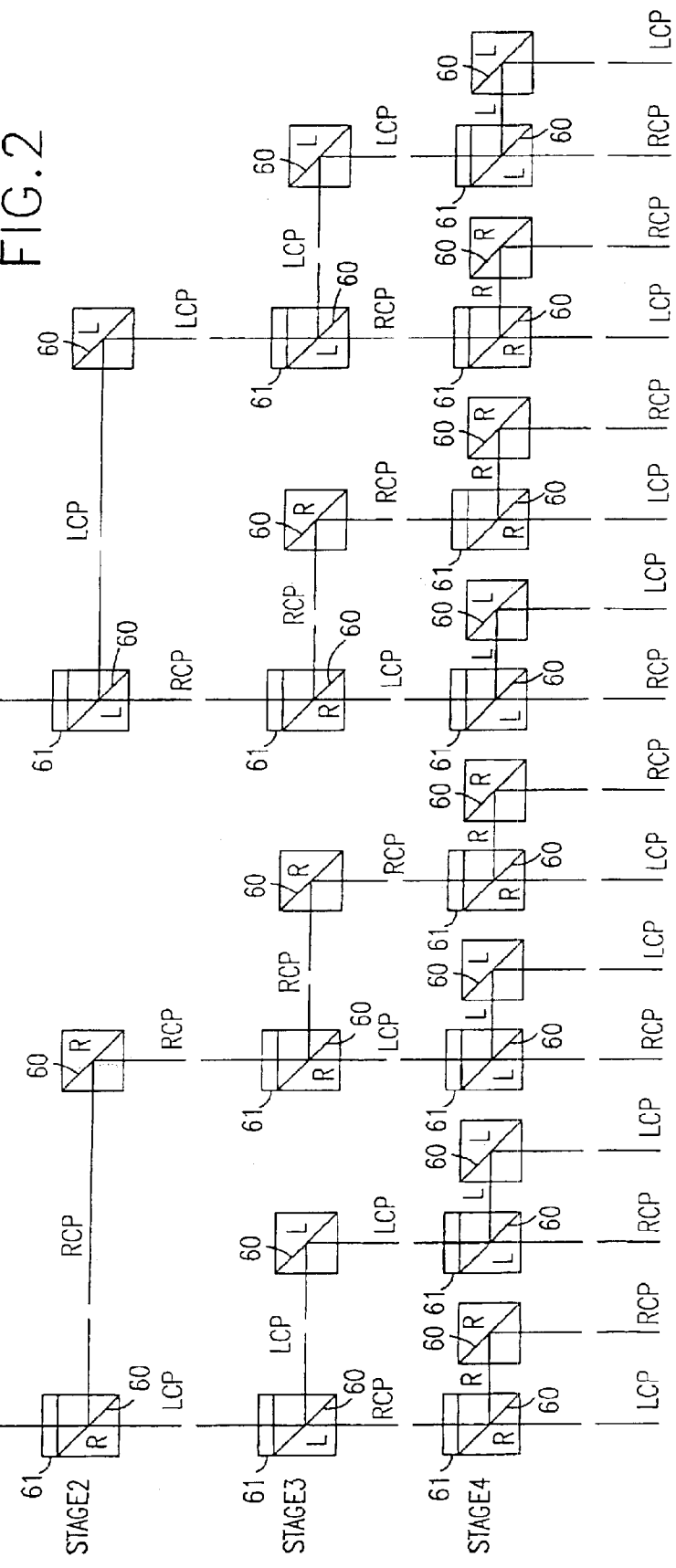
FIG. 2 is a schematic diagram of a logic tree similar to that shown in FIG. 1 which shows that the polarization of CLC members may be varied to produce outputs having polarizations different from those shown in FIG. 1.

FIG. 2 is a schematic diagram of a logic tree 1 similar to that shown in FIG. 1. It shows only the logic tree without the associated laser and electronics. The purpose is to show that the polarization of members 60 reflective of different polarizations may be varied to produce outputs having different polarizations from those shown in FIG. 1. Each of the boxes representing active and passive elements in FIG. 2 contains either the letter L or R indicating that the CLC member 60 therein is reflective of either left-handed or right-handed circular polarization. Without going into exhaustive detail, suffice it to say that the outputs shown in FIG. 2 are obtained from an LCP input having the following polarization pattern when retarders 61 are switched in the same order as described in connection with FIG. 1:

LRRL RLLR RLLR LRRL

A pattern different from that shown above would be obtained if the input polarization were changed to RCP and members 60 of logic tree 1 were reflective of polarization's opposite to those shown in FIG. 2. The output pattern is as follows:

RLLR LRRL LRRL RLLR

The foregoing illustrates how the output polarization may be controlled for applications where information is polarization encoded or scrambled; transmitted and decoded or unscrambled by using a key which controls the variable half-wave retarders 61.

From the point of view of ease of manufacturing, logic trees having the same CLC members 60 are the most advantageous as will be seen when the fabrication process is described hereinbelow.

The arrangement of FIG. 1 provides an advantage over the scanning arrangement shown in U.S. Pat. No. 5,459,591 in that input light has to traverse, in a 1024×1024 array, 1024 CLC members 2 (in the patent) to provide an output at its furthest imaging cell 1 (in the patent). If each CLC member has transmissibility (T), the final imaging cell will have a transmissibility of $(T)^{1024}$. Thus, even with a transmissibility approaching 1, say 0.999, the output at the $1024^{TH}$ imaging cell would be: $(0.999)^{1024}$ which, to all intents and purposes, is zero.

Opposed to this is the present approach where, to provide the last output in a 1024×1024 array, only twenty CLC members 60 or two per stage need to be traversed providing a transmissibility of $(T)^{20}$. Under these conditions the 1024th output, assuming T=0.999, would be $(0.999)^{20}$ which is approximately ninety percent of the input intensity. The minimum transmissibility for a ten stage array would be $(T)^{10}$ or one transition per stage.

From the foregoing, while logic tree 1 of FIG. 1 represents an improvement over the prior art in terms of output light intensity, it should be clear that each logic tree 1 requires its own input laser or source of electromagnetic radiation 17. Thus, to provide an 8×8 array, for example, eight logic trees 1 would have to be stacked in the manner shown in FIG. 3.

Figure 3:
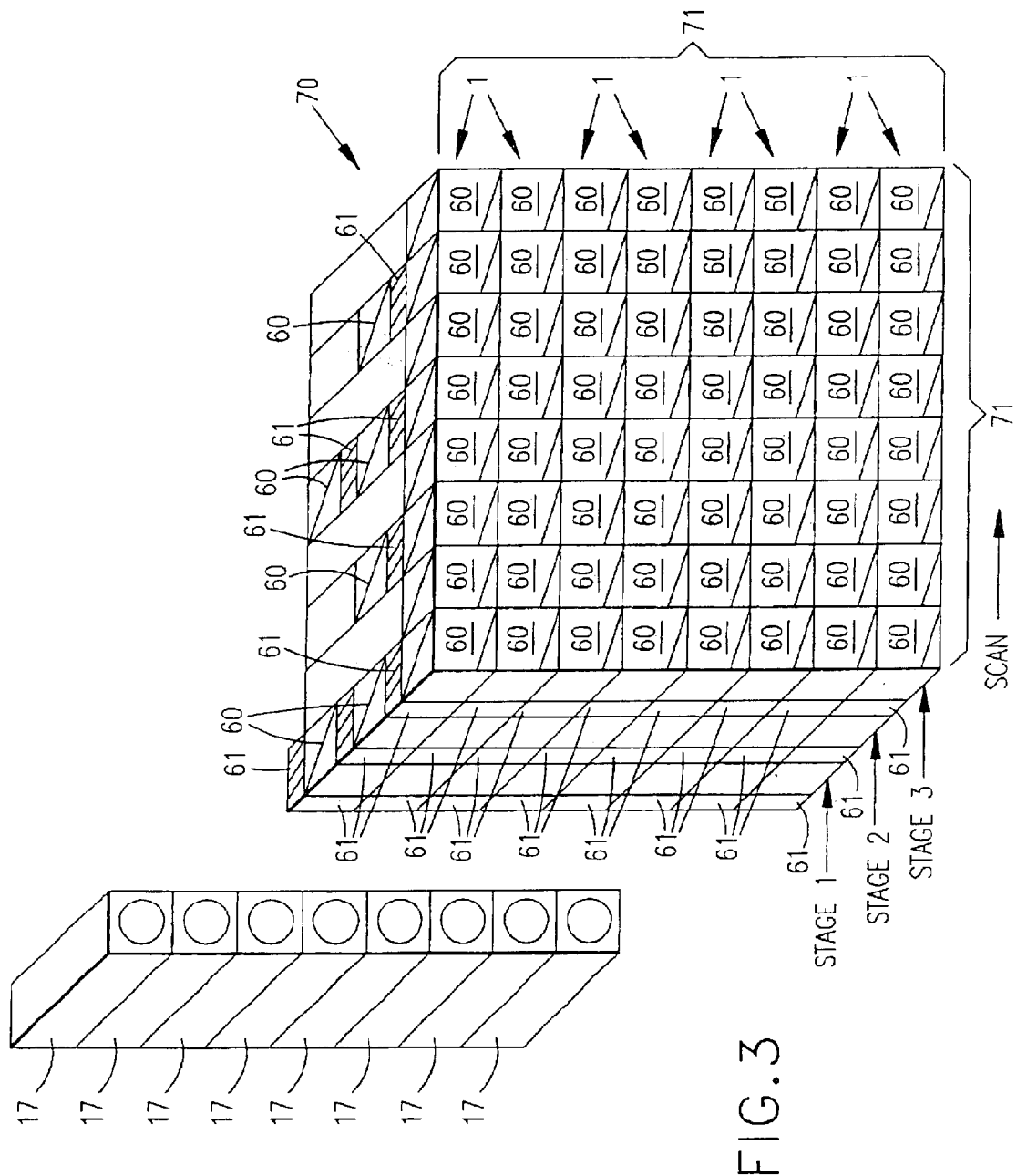
FIG. 3 is an orthographic projection of eight logic trees positioned one atop the other which, in accordance with the present invention, provide 64 outputs using one source of electromagnetic radiation per logic tree.

FIG. 3 is an orthographic projection of eight logic trees 1 positioned one atop the other which, in accordance with the teaching of the present application, provide 64 outputs. One source of electromagnetic radiation 17 per logic tree 1 is required.

Because of space limitations, the showing of FIG. 3 has been limited to the use of only three of the STAGES of FIG.

1. Also, since each of logic trees 1 in FIG. 3 is identical with the other logic trees 1, only the topmost logic tree 1 with its CLC members 60 and variable half-wave retarders 61 have been shown. Also, as will become clear hereinafter, the dimensions shown are not to scale.

In FIG. 3, 8×8 array 70 is shown which comprises eight logic trees 1 stacked one atop the other. Each logic tree 1 is comprised of three stages, STAGE 1, STAGE 2, and STAGE 3. STAGE 1 comprises branch 2; STAGE 2 comprises branches 3, 4 and STAGE 3 comprises branches 5–8 as shown in FIG. 1. Each branch includes active and passive CLC elements similar to those shown in STAGES 1–3 of FIG. 1 and each of the active and passive elements includes a cholesteric liquid crystal member 60 which is positioned at an angle of 45° within each of the active and passive elements of array 70. Also, included are variable half-wave retarders 61 which are arranged in FIG. 3 just like the variable retarders 61 in STAGES 1–3 of FIG. 1. In FIG. 3, each logic tree 1 is activated by an associated source of electromagnetic radiation 17, preferably a laser, thus requiring a total of eight sources 17. As each laser is actuated, variable half-wave retarders 61 are actuated as described in connection with FIG. 1 hereinabove and the output of each laser 17 appears as a scanned modulated signal going from left to right at the outputs of imaging cells 71 of each of logic trees 1. In the arrangement shown in FIG. 3, sources 17 and retarders 61 may be actuated sequentially or simultaneously. If the outputs of sources 17 are converted to right-hand circular polarization (RCP) and all CLC members 60 are reflective of left-hand circular polarization (LCP), the outputs of each logic tree 1 of FIG. 3 will be the same as those shown in FIG. 1, namely:

RLRL RLRL

As suggested in connection with the description of FIG. 1, fixed half-wave retarders may be appropriately positioned to make all the outputs have the same polarization.

While the number of lossy transitions per logic tree has been reduced over that shown in the prior art, this has been accomplished by the use of a source 17 for each logic tree 1 incorporated in an array 70. With arrangements like that shown in FIG. 3 expanded to a 1024×1024 array, for example, 1024 sources 17 would be required. This requirement can be eliminated and the number of sources reduced to one by using a logic tree 1 like that shown in FIG. 1, the outputs of which, provided from a single source 17, act as inputs to an array 70 like that shown in FIG. 3.

Figure 4:
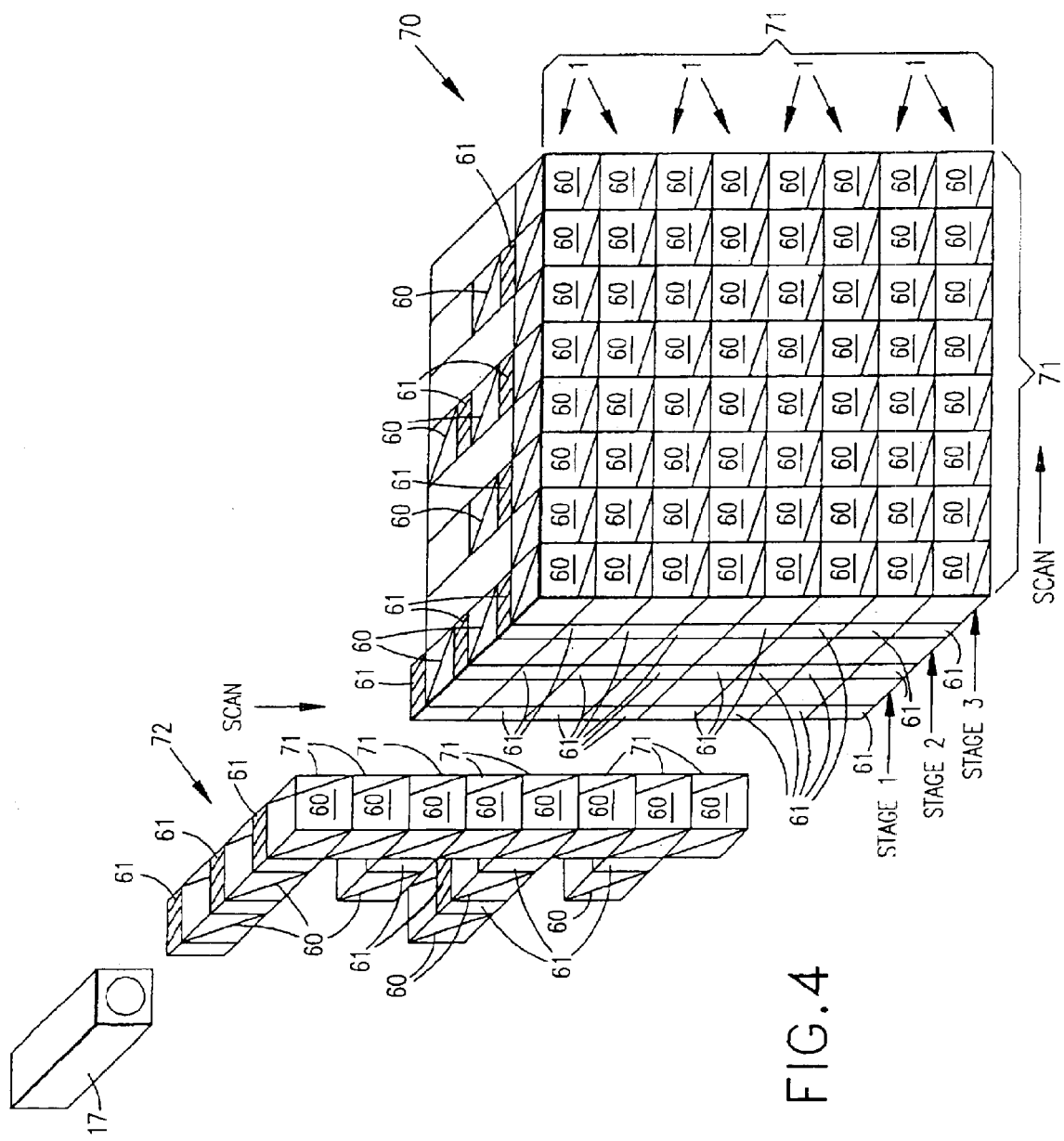
FIG. 4 is an orthographic projection similar to FIG. 3 except that, instead of a plurality of sources of electromagnetic radiation, only a single source of radiation in combination with a logic tree like that shown in FIG. 1 and disposed perpendicularly to the stacked logic trees of FIG. 3 is required.

This will become clear from a consideration of FIG. 4 which is an orthographic projection similar to FIG. 3 except that, instead of a plurality of sources 17, only a single source 17, in combination with a logic tree 1 like that shown in FIG. 1, disposed perpendicularly to the logic trees 1 of FIG. 3 is required.

Considering FIG. 4 in more detail, array 70 is identical with array 70 shown in FIG. 3. Also, source of electromagnetic radiation 17 in FIG. 4 is similar to sources 17 shown in FIB. 3. In FIG. 4, an input logic tree 72 is shown disposed between array 70 and source 17 such that each imaging cell 71 of logic tree 72 acts as an input to an associated logic tree 1 of array 70. Thus, the uppermost imaging cell 71 of input logic tree 72 provides an input to the leftmost element of the topmost of logic trees 1 of array 70. This input which may be an intensity modulated signal from source 17, is scanned across the imaging cells 71 of the topmost logic tree 1 of array 70 in a manner analogous to the scan of a television frame. When the scanned output of the topmost logic tree 1 reaches its last imaging cell 71, the output of source 17 is switched to the next imaging cell 71 (immediately beneath the topmost imaging cell 71) of logic tree 72. The output of that next imaging cell then acts as the input to the logic tree 1 immediately beneath the topmost logic tree 1 of array 70. The inputs to the last mentioned logic tree 1 are then delivered to the imaging cells 71 of that logic tree 1 in sequence from left-to-right providing a scanned, intensity modulated signal similar to that of a television scan line.

Each of the remaining imaging cells 71 of input logic tree 72 is then actuated by programming electrodes 62 and variable half-wave retarders 61 associated with logic tree 72 in the same manner described hereinabove in connection with FIG. 1. Similarly, each of the logic trees 1 of array 70 is actuated by outputs from an associated imaging cell 71 of input logic tree 72. Then, under control of programmed electrodes 62 and half-wave retarders 61, these outputs, now inputs, to an associated logic tree 1, are delivered to the imaging cells 71 of each logic tree 1 as a scanned line having portions which may vary in intensity from imaging cell 71-to-imaging cell 71. In this way, by accessing logic trees 1 from top-to-bottom, for example, in FIG. 4, an image is built up which, depending on the imaging cell density, can provide images of extremely high resolution.

From the foregoing, it should be clear that the modulated output of a single source 17, preferably a laser, may be delivered to the imaging cells 71 of a plurality of stacked logic trees 1 like array 70 in FIG. 4. As shown in FIG. 4, the use of an input logic tree 72 permits the use of a single source 17 as opposed to the multiplicity of sources 17 shown in FIG. 3. The value of the arrangement shown in FIG. 4 becomes more apparent when it is recalled that for a 1024×1024 array embodiment like FIG. 3, 1024 lasers would be required. Thus, in addition to reducing the number of lossy transitions as provided by the embodiment of FIG. 3, the embodiment shown in FIG. 4 also reduces the number of sources 17 required to the absolute minimum of one. While the electronic equipment required to operate displays like those shown in FIGS. 3, 4, has not been shown, it should be appreciated that the same components as shown in FIG. 1 and which are well-known in the imaging arts may be utilized in the practice of the present invention. Thus, timing information obtained from camera 25, for example, is applied via interconnection 28 to programmable pulsed sources 27. The latter then applies switching signals to both logic tree 72 and each of logic trees 1 to appropriately control their electrodes 62 and half-wave retarders 60 so that a scanned energy output may be delivered from the imaging cells 71 of each logic tree 1 and input logic tree 72.

Figure 5:
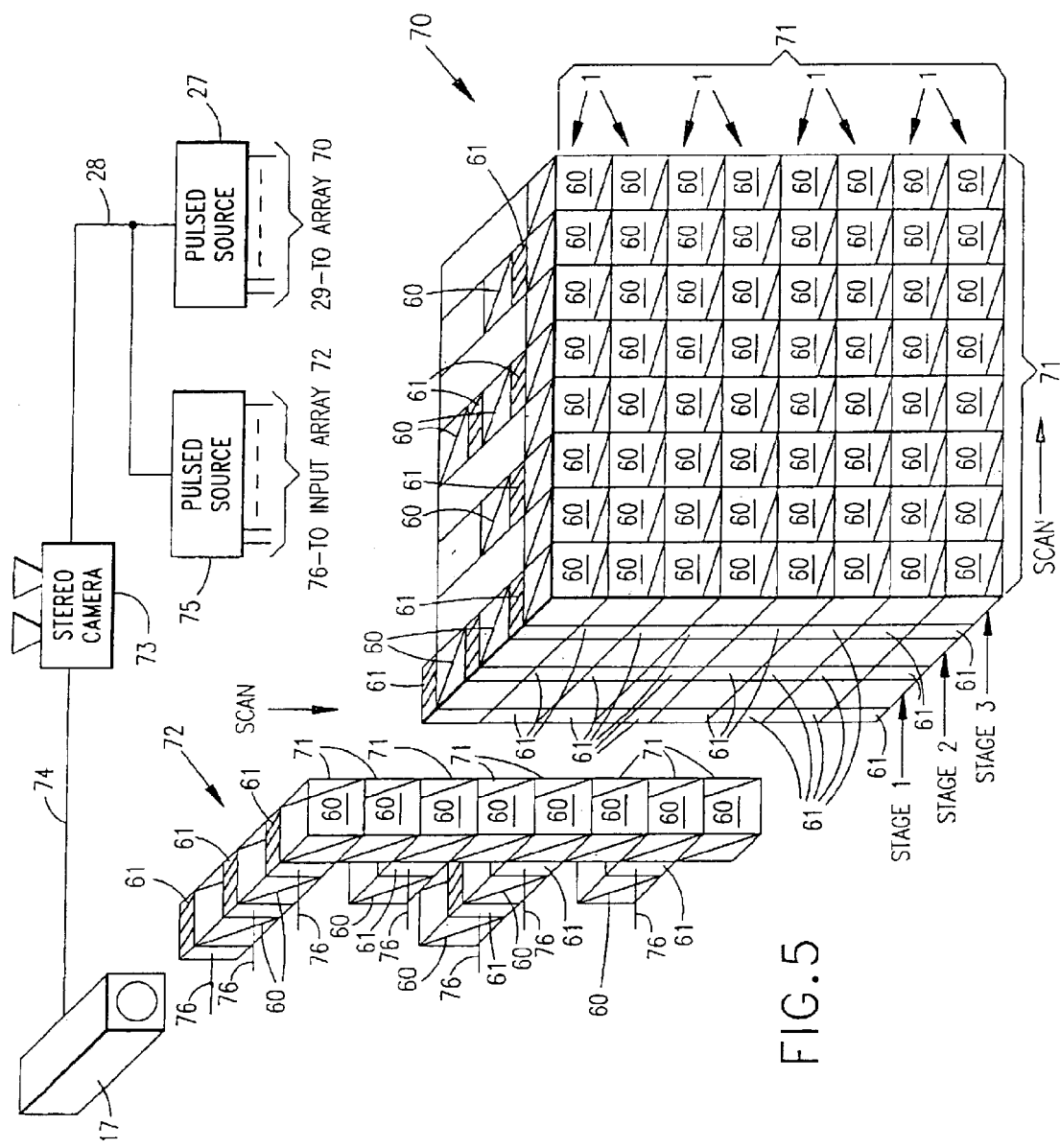
FIG. 5 is an orthographic projection of an imaging array and its associated electronics which, in conjunction with viewing glasses and stereo displaced images, provides a 3-D display.

Referring now to FIG. 5, an orthographic projection of an imaging array is shown which, in combination with viewing glasses and stereo displaced images provides a 3-D display.

In FIG. 5, input logic tree 72 is accessed by a source 17 of electromagnetic radiation which is modulated by outputs of a stereoscopic television camera 73 via interconnection 74. The two outputs from stereo camera 73 are stereo displaced so that, if they are separated one from the other by some characteristic like polarization, the two resulting images may be delivered one to each eye (using appropriate glasses) and combined in the brain to provide a three-dimensional image.

One of the images is provided by applying scanned lines from stereo camera 73 via interconnection 74 to laser 17. The output of the latter is then applied to input logic tree 72 from which scanned line outputs are delivered from the topmost and alternate imaging cells 71 under control of programmable pulsed source 75 which actuates variable half-wave retarders 61 thereof via interconnections 76. The output from the topmost of imaging cells 71 of input logic tree 72 is applied for a given interval to leftmost member 60 of the uppermost of logic trees 1. At the same time, variable half-wave retarders 61 under control of programmable pulsed source 27 are appropriately actuated so that a portion of the scanned line from stereo camera 73 is delivered to each of the imaging cells 71 of the uppermost of logic trees 1 of array 70.

In the instance of FIG. 5, each imaging cell 71 of array 70 is illuminated for a time equal to $\frac{1}{8}$ the given interval of a scanned line from camera 73. For a 1024×1024 array, the illuminating time would be $\frac{1}{1024}^{TH}$ of the scanned line interval.

The first image is completed by applying scanned lines from stereo camera 73 via interconnection 74 which modulate laser 17 during each alternate interval after the first to each alternate imaging cell 71 after the first imaging cell 71 of input logic tree 72. Each scanned line is delivered to the imaging cells 71 of each alternate logic tree 1 of array 70 in the same manner described in connection with the delivery of the first scanned line to the uppermost of logic trees 1 of array 70.

The stereo displaced image from stereo camera 73 is delivered as scanned lines via interconnection 74 to laser 17 where they modulate the output of laser 17. The stereo displaced scanned line outputs are delivered to laser 17 during the second and alternate intervals after the second interval. The first stereo displaced output from laser 17, under control of programmable pulsed source 75 which appropriately actuates the variable half-wave retarders 61 of input logic tree 72, is delivered to the second-from-the-top of imaging cells 71 of logic tree 72 as a scanned line. This last mentioned output acting as an input to the leftmost CLC member 60 of the second-from-the-top of logic trees 1 of array 70 is delivered to the imaging cells 71 of the second-from-the-top of logic trees 1 of array 70 under control of programmable pulsed source 27 as portions of the scanned line output of laser 17.

As with the first image generation, the imaging cells 71 of the stereo displaced image are illuminated for a time equal to $\frac{1}{8}$ the given interval of a scanned line.

The stereo displaced image is completed by applying scanned lines from stereo camera 73 via interconnection 74 to laser 17 during each alternate interval after the second interval to each alternate imaging cell 71 after the second imaging cell 71 of input logic tree 72. Each stereo displaced scanned line is delivered to the imaging cells 71 of the second and alternate logic trees 1 of array 70 in the same manner described in connection with the delivery of the first stereo displaced scanned line to the second-from-the-top of logic trees 1 of array 70.

If the polarization applied to logic trees 1 is RCP and the members 60 thereof are designed to reflect LCP, logic trees 1 provide an image at their imaging cells 71 in the same way described in connection with FIG. 1 and the resulting outputs will have polarizations like those shown in FIG. 1. The polarizations at STAGE 3 for each of logic trees 1 are:

RLRL RLRL

To obtain this result, however, input logic tree 72 must provide RCP at all its imaging cells 71. This requires an RCP input from laser 71, a logic tree with elements which reflect LCP and fixed half-wave retarders 63 (not shown) disposed after imaging cells 71 which provide LCP outputs.

To obtain a single polarization for all of the outputs of first and alternate logic trees 1 of array 70, for example, RCP, the LCP outputs of these logic trees 1 must be converted to RCP.

This is accomplished by interposing fixed half-wave retarders 63 over the imaging cells 71 having LCP outputs.

Similarly, to obtain a single but opposite polarization for all of the outputs of the second and alternate logic trees 71, for example, LCP, the RCP outputs of these logic trees 1 must be converted to LCP. This is accomplished by interposing fixed-half wave retarders 63 over the imaging cells 71 having RCP outputs.

At this point, two stereo-displaced images appear at the output imaging cells 71 of array 70. One image has an RCP polarization while the other has an LCP polarization. Then, using glasses which have one lens which passes RCP and another lens which passes LCP, a 3-D image is perceived by a viewer.

In connection with the 3-D embodiment of FIG. 5, it should be appreciated that outputs from stereo camera 73 may be in either digital or analog form. If the former, the digital signals may be converted to analog signals using a digital-to-analog converter in a well-known way. Also, to the extent that logic trees 1 are provided with signals representing a scanned line of an image and a stereo displaced image, these signals are arranged to alternately access alternate ones of logic trees 1 in succession until two stereo displaced images are formed at the imaging cells 71 of array 70. The scanned lines of an image and a stereo displaced image are electronically interlaced so that source 17 is modulated first by signals representing a scanned image and then by signals representing a scanned stereo displaced image and so on in succession until the two images are formed.

From FIG. 5, it can be seen that, for a 3-D array, two 4×8 interleaved arrays are required, one for an image and another for a stereo displaced image. Extrapolating this information to a practical level, if 1024 imaging cells are wanted for each image, an array of 2048×1024 imaging cells would be required. Using the same approach as demonstrated by FIG. 5, two 512×1024 interleaved arrays may be used with the sacrifice of some resolution. In FIG. 5, logic trees 1 have been interleaved horizontally for ease of fabrication but, they may be interleaved vertically without departing from the spirit of the present application.

Figure 6:
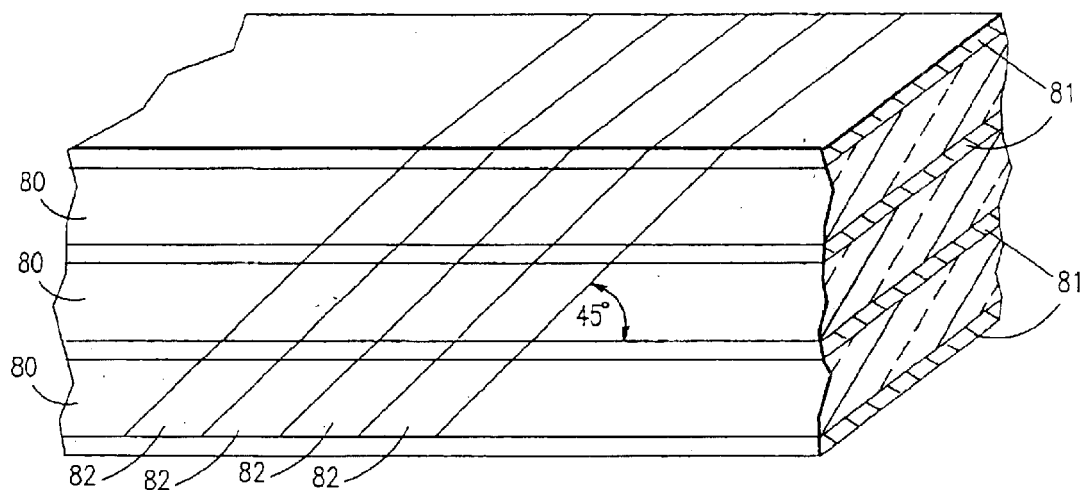
FIG. 6 is an orthographic, cut-away projection of a plurality of layers of insulating material like $SiO_2$ and a plurality of layers of CLC material interleaved with the layers of insulating material. The interleaved layers are sliced at an angle of 45°.

Referring now to FIG. 6, there is shown an orthographic, cut-away projection of a plurality of layers 80 of insulating material, like $SiO_2$, polycarbonate, acrylic or any other appropriate optically transparent material, and a plurality of layers 81 of cholesteric liquid crystal (CLC) material interleaved with layers 80.

In FIG. 6, layers 80, 81 are subjected to a slicing operation which cuts into layers 80, 81 at an angle, preferably 45°. Layers 80, 81 may be cut by saws, lasers, jets or other appropriate tool to provide layers 82 which contain CLC members 60 disposed at an angle of 45° in insulating material as shown in FIG. 7.

Figure 7:
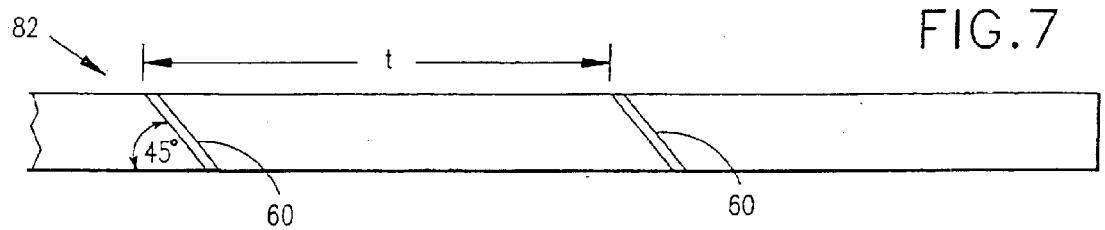
FIG. 7 is a cross-sectional view of a layer of insulating material in which CLC members are disposed at an angle of 45° and are spaced apart by a distance t.

FIG. 7 is a cross-sectional view of a layer of insulating material in which CLC members 60 are disposed at an angle of 45°. The spacing of CLC members 60 is determined by controlling the thicknesses of insulating layers 80 prior to the slicing step of FIG. 6. Since alignment of CLC members 60 is important in transmitting electromagnetic energy from stage-to-stage the spacing of members 60 must be carefully controlled. Thus, in FIG. 7, the spacing between CLC members 60 is t units and could comprise STAGE 1, for example, of array 70 of FIG. 4.

Figure 8:
FIG. 8 is a cross-sectional view of a layer of insulating material in which CLC members are disposed at an angle of 45° and is similar to FIG. 7 except that the CLC members are spaced apart by a distance t/2.

FIG. 8 is a cross-sectional view of a layer of insulating material in which members 60 are disposed at an angle of 45° and is similar to FIG. 7 except that members 60 are spaced apart by t/2 units. Layer 82 and other like layers are fabricated by slicing an arrangement like that shown in FIG.

6 except that the thicknesses of layers 80 of insulating material are reduced to half that shown in FIG. 6. After slicing a stack like that shown in FIG. 6, the resulting layer 82 with a spacing of t/2 between members 60 could comprise stage 2, for example, of array 70 of FIG. 4.

Figure 9:
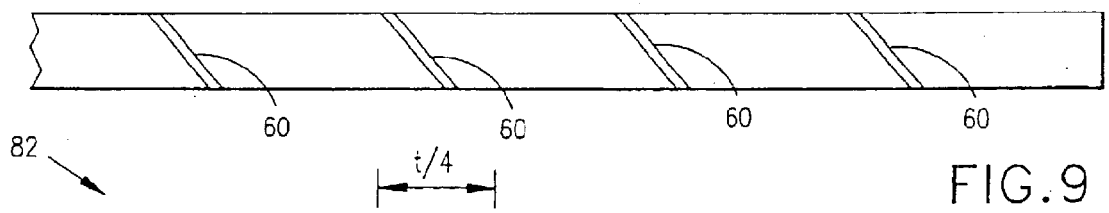
FIG. 9 is a cross-sectional view similar to that shown in FIG. 7 except that the CLC members are spaced apart by a distance t/4.

FIG. 9 is a cross-sectional view of a layer of insulating material in which members 60 are disposed at an angle of 45° and is similar to FIG. 7 except that members 60 are spaced apart by t/4 units. Layer 82 in FIG. 9 is fabricated by slicing an arrangement like that shown in FIG. 6 except that the thicknesses layers 80 would be reduced to one-quarter that shown in FIG. 6. After slicing a stack like that shown in FIG. 6, the resulting layer 82 with a spacing of t/4 between members 60 could comprise STAGE 3, for example, of array 70 of FIG. 4.

The spacing of members 60 is always reduced by half as additional stages are added so that higher and higher resolutions may be obtained. Thus, for an array with ten stages, the spacing between CLC members 60 would be t/512 units.

By slicing arrangements like that shown in FIG. 6 and controlling the thicknesses of layers 80, layers 82 with members 60 spaced apart by different amounts like those shown in FIGS. 7–9 may be easily obtained. As will be seen below, layers 82 with appropriately spaced members 60 may be stacked to produce an array 70 like that shown in FIG. 4 or an array having as many stages as desired. This can be done on a mass-production basis to produce literally thousands of layers like layers 82 of FIGS. 7–9.

Figure 10:
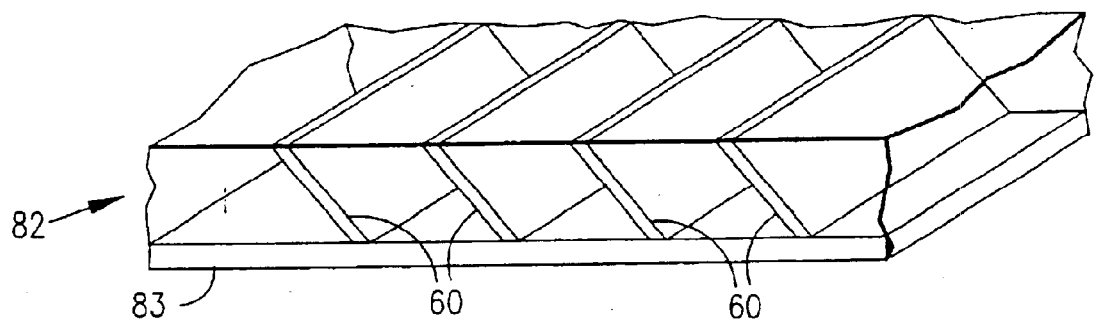
FIG. 10 is a cross-sectional, orthographic projection of an insulation layer with CLC members disposed at an angle of 45° therein like that shown in FIG. 8 and further includes a ground plane disposed on the bottom thereof.

FIG. 10 is a cross-sectional, orthographic projection of a layer 82 which contains CLC members 60 disposed at an angle of 45° therein. Layer 82 in FIG. 10 is similar to layer 82 of FIG. 8 except that in FIG. 10, a ground plane 83 is deposited or formed on the bottom of layer 82. Layer 83 is transparent and metallic in character and acts as a ground plane for subsequently deposited electrodes which activate variable half-wave retarders 61. A material like indium-tin oxide (ITO) may be deposited or formed in a well-known way on the bottom of layer 82 of FIG. 10. The transparency of ITO, of course, permits the transmission of light energy from stage-to-stage with little or no loss in intensity.

Figure 11:
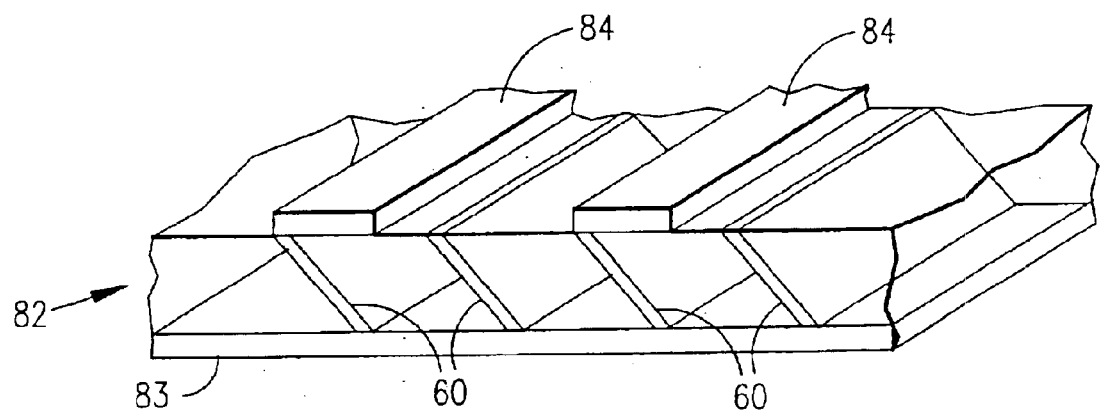
FIG. 11 is a cross-sectional orthographic projection similar to FIG. 10 except that it further includes electrodes disposed over every other CLC member.

Referring to FIG. 11, there is shown a cross-sectional, orthographic projection similar to FIG. 10 except that electrodes 84 are shown disposed over every other CLC member 60, like they would be if layer 83 of FIG. 11 were to be utilized as a STAGE 2 in an array 70 like that shown in FIG. 4. This pattern of electrode spacing will always be the same regardless of which stage is being considered. A reconsideration of FIG. 1 shows this to be true since each stage always comprises at least one branch consisting of active and passive CLC elements. Electrode 84 (62 in FIG. 1) is always associated with and forms a part of variable half-wave retarders 61 which, in turn, is always associated with the active CLC element of any branch. Like ground plane 83, electrode 84 is comprised of indium-tin-oxide (ITO) material which is transparent to the electromagnetic radiation being utilized. To obtain electrodes 84 in the form shown in FIG. 11, indium-tin oxide is formed atop layer 82 and, using well-known lithographic, masking and etching techniques, electrodes 84 are appropriately positioned over every other CLC member 60. Rather than carrying out two separate deposition steps for ground plane 83 and electrodes 84, the ITO material may be formed simultaneously on each side of layer 82. Then, the photolithographic, masking and etching steps are carried out.

Figure 12:
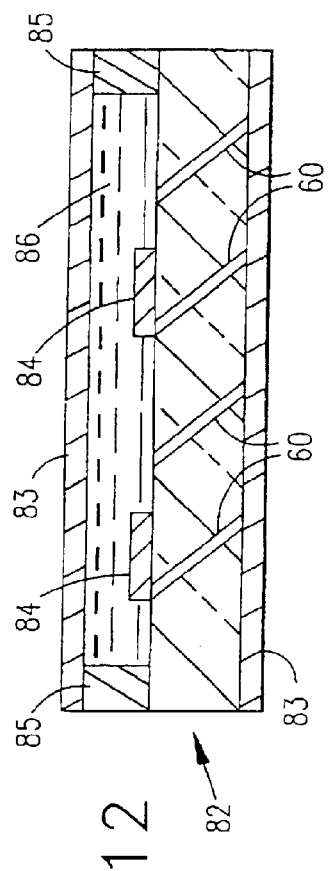
FIG. 12 is a cross-sectional view similar to that shown in FIG. 11 further including a spacer disposed around the periphery of the layer of insulation material with the resulting enclosed volume filled with a phase-shifter material in liquid form.

Referring now to FIG. 12, there is shown a cross-sectional view of a layer 82 similar to that shown in FIG. 11 except that a spacer is added around the periphery of layer 82 and the thus enclosed volume is filled with a phase-shifter material in liquid form.

In FIG. 12, a spacer 85 is formed around the periphery of layer 82 by, for example, gluing a spacer 85 of insulating material around the edge of layer 82. Spacer 85 separates layers 82 from other overlying layers and defines the volume into which phase-shifter material 86 is placed.

Figure 13:
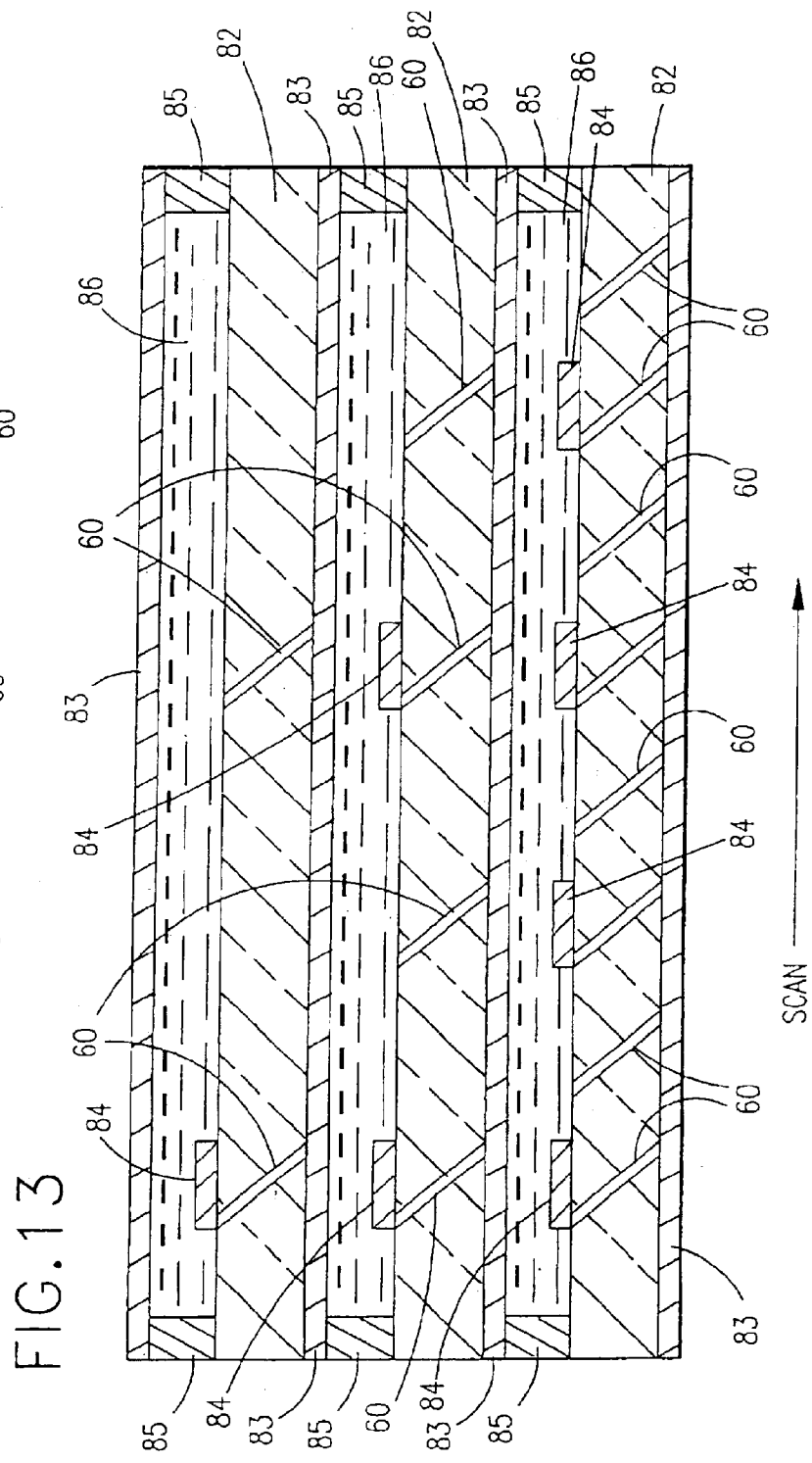
FIG. 13 is a top view of a logic tree made up of layers like those shown in FIGS. 7–12 after they have been stacked and aligned to form an array like those shown in FIGS. 4, 5.

FIG. 13 is a top view of a logic tree 1 made up of layers 82 like those shown in FIGS. 7–12. The arrangement of FIG. 13 shows the topmost logic tree 1 of FIG. 4 after it has been fabricated in accordance with the teaching of the present application. FIG. 13 can also be considered a side-view of input logic tree 72 since its structure does not depart in any way from the structure of logic tree 1.

One way of assembling the structure of FIG. 13, is to stack a finished layer 82 like that shown in FIG. 12 on a finished layer 82 like that shown at the bottom of FIG. 13. Another layer 82 like that shown at the top of FIG. 13 is stacked atop the finished layer 82 of FIG. 12. The layers are glued together with the topmost layer 82 forming STAGE 1 as shown in FIG. 4; the middle layer 82 forming STAGE 2 as shown in FIG. 4 and the bottom layer 82 forming STAGE 3 as shown in FIG. 4. Thus, inputs provided to the leftmost CLC member 60 of topmost layer 82 will, under control of inputs to electrodes 84 from pulsed source 27, appear as outputs emanating, from left-to-right, from CLC members 60 of bottommost layer 82 as a scanned line of modulated or unmodulated light.

For the array, once stacked, the top and bottom thereof may be covered with insulating layers, one of which contains holes which register with the ends of electrodes 84 and ground planes 83. Thus, even when logic trees 1 are not being utilized, their associated electrodes 61, 84 which extend from top-to-bottom of array 70 and are electrically connected as shown in FIG. 5 are simultaneously energized.

Inputs to the stacked logic trees 1 are provided, as shown in FIG. 4, from imaging cells 71 of input logic tree 72. The orientation of input logic tree 72 with respect to array 70 is best shown in FIG. 4 which does not depart in any way from the arrangement of FIG. 13. The latter figure merely shows the structural details to better effect. Thus, as previously explained in FIG. 4, outputs from imaging cells 71 of input logic tree 72 are scanned from top-to-bottom of tree 72 and each output initially accesses the leftmost member 60 of its associated logic tree 1 such that outputs appear at imaging cells 71 of array 70 as a plurality of left-to-right scans which go from the topmost logic tree 1 to the bottommost logic tree 1 of array 70.

Input logic tree 72 may take the form of an array 70 rotated 90° so that imaging cells 71 there of register with the leftmost retarder 61 of each of the logic trees 1 like lasers 17 as shown in FIG. 3. In this instance, only a single logic tree 1 of the rotated array 70 is energized.

Alternatively, the array shown in FIG. 13 may be fabricated without introducing the phase shifter material 86. The structure of FIG. 13 is then sliced in a direction parallel to the surface there of resulting in a structure similar to input logic tree 72 as shown in FIG. 4. The resulting slice is placed on an insulating layer and bonded to it. A cover layer of insulating material having holes therein which register with electrodes 84 and ground planes 83 is fabricated by drilling or etching using well-known photolithographic techniques. The volumes enclosed by the insulation layer are now filled with liquid phase shifter material 86. The cover layer is affixed to the other side of the logic tree slice. A metallic layer such as aluminum is then deposited on the surface of the cover layer and in the holes previously formed therein.

Then, using well-known photolithographic masking and etching techniques, conductors to electrodes 84 in a ground planes 83 are formed Without going into exhaustive detail, it should be appreciated that the side of input logic tree 72 of FIG. 4 may be butted against the back of array 70. In this way, the overall thickness of the arrangement of FIG. 4 is substantially reduced. Well-known optical techniques using reflectors may be used to apply a 90° turn to light emanating from imaging cells 71 of tree 72 when it is butted against the back of array 70.

Since electrodes 84 extend from front-to-back on each logic tree 1 as shown, for example, in FIG. 13, they are best accessed from the front or back of the array with activating metallic lines 29, as shown in FIG. 4, extending in insulated spaced relationship with a surface of array 70 to a plug which can be connected to pulsed source 27, for example. This may be accomplished using well-known photolithographic and etching techniques.

The arrangements shown in FIGS. 6–12 may have the following typical dimensions:

| | |
|---|---|
| Layers 82 | 0.5 mm thick and up |
| Electrodes 84 | 500 Å to 1000 Å thick |
| Ground Planes 83 | 500 Å to 1000 Å thick |
| Spacer 85 | 1μ to 10μ thick |
| Elements 60 | 2μ to 30μ thick |
| Cells 71 | 0.5 mm wide and up. May exceed 10 cm |

Typical voltages applied to electrodes 84 may range between 5V and 100V.

From the foregoing, it should be clear that arrays 70 may range in size from that typical of T.V. sets used in the home to displays similar to those used in stadia. The resulting arrays are flat, light weight, require but a single laser source or multiple laser sources and are inexpensive and easily fabricated.

I claim:

1. A method for fabricating an array comprising the steps of:
    forming a plurality of insulating media having a plurality of wavelength and polarizing elements embedded therein at an angle relative to the surfaces of said media such that the spacing between elements halves for each different medium in said plurality of said media,
    forming a phase shifter arrangement such that a portions thereof of conductive material are disposed on one of said surfaces of said media in registry with every other element in each of said media and other portions of which of conductive material are disposed on another of said surfaces overlapping all of said elements, and, a phase shifting material disposed over at least said every other element
    stacking said plurality of media such that the topmost insulating medium has two elements and each succeeding medium has twice as many elements as a preceding medium.

2. A method according to claim 1 wherein the steps of forming a plurality of insulating media includes the steps of:
    stacking alternating layers of an insulating material and a wavelength and polarization sensitive material the thickness of said layers of insulating material determining the spacing between said elements, and
    slicing said layers at an angle to form said plurality of insulating media with said elements embedded therein.

3. A method according to claim 1 wherein the steps of forming a phase shifter arrangement include the steps of:
    depositing transparent, conductive layers on said surfaces of said insulating media,
    forming said portions of said conductive material on said one of said surfaces of each of said media by photolithography,
    affixing a spacer of insulating material about the periphery of said one of said surfaces of each of said media, and
    introducing a phase shifting material over said one of said surfaces of each of said media.

4. A method according to claim 1 further including the step of sealing the topmost of said media with a layer of insulating material.

5. A method according to claim 1 wherein said insulating media are made of $SiO_2$.

6. A method according to claim 1 wherein said insulating media are made of optically transparent layers.

7. A method according to claim 1 wherein said elements are made of cholesteric liquid crystal material.

8. A method according to claim 1 wherein said angle is 45°.

9. A method according to claim 1 wherein said conductive material is indium tin oxide.

10. A method according to claim 3 wherein said phase shifting material is in liquid form.

11. A method according to claim 3 wherein said phase shifting material is a liquid crystal.

12. A method according to claim 3 wherein said phase shifting material is a solid state electro-optic material.

* * * * *